United States Patent [19]
Caruso

[11] Patent Number: 5,645,119
[45] Date of Patent: Jul. 8, 1997

[54] VEHICLE SUNSHIELD

[75] Inventor: Tony Caruso, Edenvale, South Africa

[73] Assignee: Caruso Engineering CC, Kempton Park, South Africa

[21] Appl. No.: 514,219

[22] Filed: Aug. 11, 1995

[30]  Foreign Application Priority Data

Aug. 11, 1994 [ZA] South Africa .................. 94/6026

[51] Int. Cl.$^6$ ........................................... B60J 1/20
[52] U.S. Cl. ................... 160/370.23; 160/84.06; 160/178.2; 160/370.21; 296/97.4; 296/97.11
[58] Field of Search ................... 160/170, 172, 160/178.1 R, 84.06, 84.02, 168.1 P, 265, 370.21, 320.22, 370.23, 321; 296/97.4, 97.8, 97.11, 141

[56]  References Cited

U.S. PATENT DOCUMENTS

| | | | |
|---|---|---|---|
| 2,148,816 | 2/1939 | Grassby, Jr. | 160/178.1 R |
| 2,328,305 | 8/1943 | De Stefano | 160/172 R X |
| 2,687,769 | 8/1954 | Gershuny | 160/170 R |
| 4,726,410 | 2/1988 | Fresh | 160/171 R X |
| 4,758,041 | 7/1988 | Labeur . | |
| 4,758,042 | 7/1988 | Liu | 296/97.8 X |
| 4,775,180 | 10/1988 | Phillips | 160/370.23 X |
| 4,777,994 | 10/1988 | Nederveld | 296/97.8 X |
| 4,898,224 | 2/1990 | Woodworth | 160/265 X |
| 5,137,072 | 8/1992 | Traspadini . | |
| 5,201,810 | 4/1993 | Ojima et al. | 160/265 |
| 5,291,934 | 3/1994 | Ouvrard et al. | 160/370.21 X |

FOREIGN PATENT DOCUMENTS

| | | | |
|---|---|---|---|
| 601454 | 6/1994 | European Pat. Off. | 296/97.4 |
| 939708 | 6/1982 | U.S.S.R. | 160/370.23 |

Primary Examiner—Blair Johnson
Assistant Examiner—Bruce A. Lev
Attorney, Agent, or Firm—Birch, Stewart, Kolasch & Birch, LLP

[57]  ABSTRACT

A vehicle sunshield includes a folding blind shaped and sized to substantially cover a vehicle rear windscreen. An array of parallel transversely extending spars support the blind at spaced intervals. A guide track is mounted vertically towards the center of the windscreen between upper and lower edges thereof. Carriages supporting the spars are mounted slidably to the guide track, so as to allow the blind to be guided between a folded position in which the windscreen is unshaded and in the deployed position. A remotely operable drive motor is provided for driving the blind up and down along the guide track. The invention includes a similar sunshield for covering a vehicle front windscreen.

6 Claims, 3 Drawing Sheets

VEHICLE SUNSHIELD

BACKGROUND OF THE INVENTION

THIS invention relates to a vehicle sunshield.

One form of currently available sunshield for fitting against the front and rear windscreens of a vehicle comprises a windscreen-shaped section of cardboard or the like which is formed with a series of parallel folds so as to allow it to concertina into a deployed position and to be folded back into a relatively compact position for stowage. Another form of sunshield is in the form of a wire hoop enclosing a section of opaque material, which can be twisted into a double or triple coil for stowage purposes.

Both of the above described sunshields are relatively inconvenient, in that they have to be manually manipulated during deployment and stowage. Further, they do not always form a snug fit with the windscreen, and tend to get damaged when in the loose stowed position.

SUMMARY OF THE INVENTION

According to the invention there is provided a vehicle sunshield comprising a blind shaped and sized to substantially cover a vehicle windscreen, at least one transversely extending spar supporting the blind, guide means arranged to act midway along the spar for guiding the blind between a stowed position in which the windscreen is unshaded and a deployed position in which the windscreen is shaded, and drive means for driving the guide means.

Preferably, the guide means comprises a guide track which is arranged to be mounted vertically towards the centre of the windscreen between upper and lower edges thereof, and at least one carriage supporting the spar and mounted slidably to the guide track.

Conveniently, the drive means comprises a reversible motor, a drive cable and at least one pulley means around which the drive cable is passed, the drive cable being fixed to the carriage or spar.

Typically, the blind is supported on a plurality of parallel spaced apart spars, each spar being mounted to a separate carriage.

The drive means may comprise a double reel or spool arranged to be driven rotatably by the motor, the double reel comprising a first spool to which one end of the cable is affixed and an adjacent second spool to which the other end of the cable is affixed, whereby rotation of the double reel in one direction causes unwinding of the one end of the cable and winding up of the other end of the cable, and rotation of the double reel in the other direction has the opposite effect.

The invention extends to a vehicle sunshield arrangement comprising a vehicle sunshield of the type described above for fitting to a vehicle rear windscreen and a front sunshield for fitting to a front windscreen, the front sunshield comprising a blind shaped and sized to substantially cover the front windscreen, at least one transversely extending spar supporting an upper edge of the blind and connector means for allowing the spar to be detachably mounted to an upper centrally located fixture within the vehicle.

According to a further aspect of the invention there is provided a vehicle sunshield comprising a blind shaped and sized to substantially cover a vehicle windscreen, at least one transversely extending spar supporting an upper edge of the blind, and connector means for allowing the spar to be detachably mounted to an upper central fixture within the vehicle, the blind being formed from a semi-rigid material which has alternate parallel convex and concave folds formed therein to allow the blind to concertina into the stowed position.

BRIEF DESCRIPTION OF THE DRAWINGS

FIGS. 2A, 2B & 2C show detailed views of various components of the sunshield;

FIG. 3 shows a detailed perspective view of a carriage assembly of FIG. 2;

DESCRIPTION OF EMBODIMENTS

Figure 1:
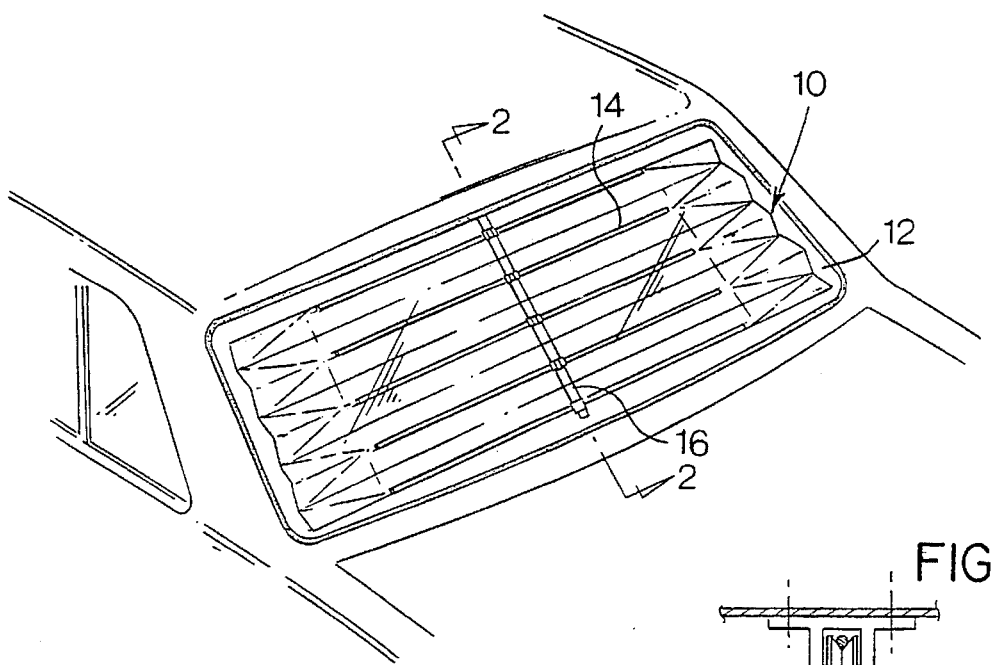
FIG. 1 shows a perspective view of a sunshield of the invention fitted to a rear windscreen of a vehicle.
Figure 2A:
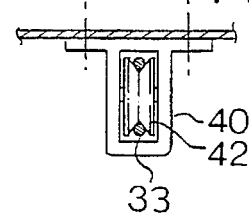
Figure 2:
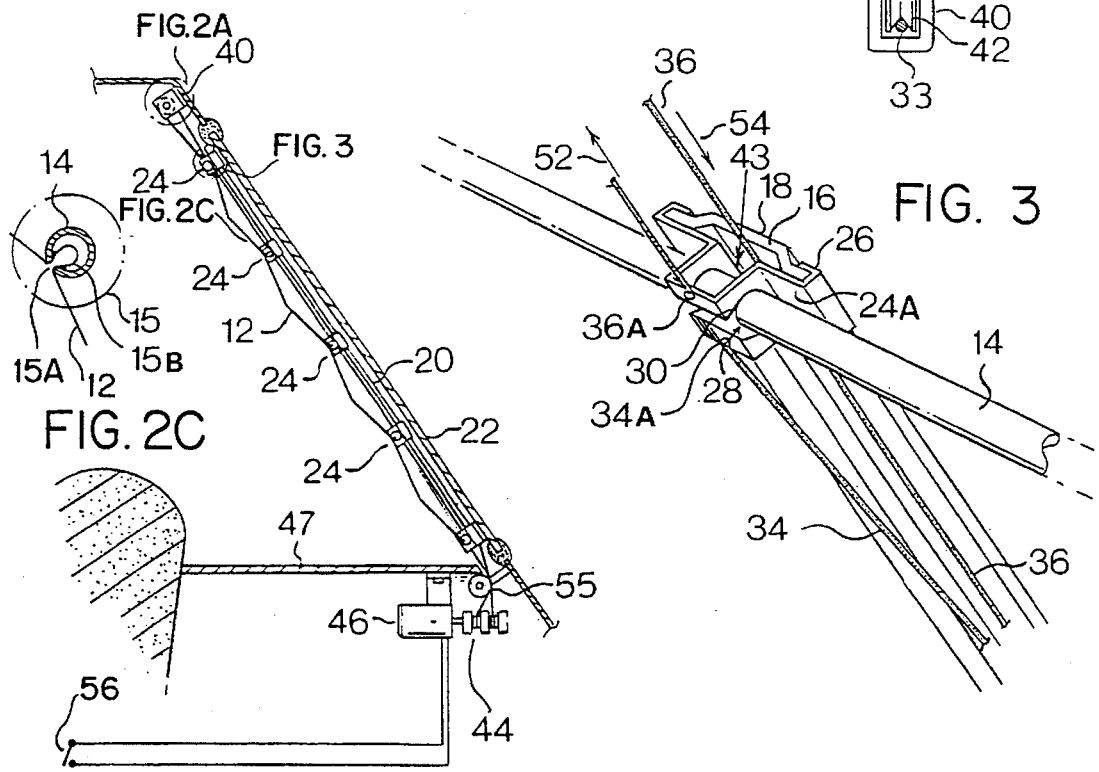
FIG. 2 shows a cross section on the line 2—2 of FIG. 1.

Referring first to FIG. 1, a sunshield 10 comprises a substantially trapezoidal sheet forming a semi-rigid foldable blind 12. In this particular embodiment, the blind comprises a woven synthetic fabric which is UV-protected and sold under the name Tyvek®. A series of spaced parallel reinforcing ribs or spars 14 extend transversally along a central portion of the material, and are fixed to the material in the manner indicated in detail at 15 in FIGS. 2 and 2C. Each spar 14 is hollow, and is formed with an elongate slit 15A. A folded edge 15B of the material 12 is inserted into the slot and glued into position on the material.

As can be seen more clearly in FIG. 3, a central guide rail or track 16 is mounted in the vertical position midway along the windscreen. In one version of the invention, the rearmost face 18 of the guide rail is glued to the inner surface 20 of the rear windscreen 22. Alternatively, the guide rail 16 may be fixed at its lower and upper ends to the respective rear dash and interior roof edge of the vehicle. The guide rail is formed from a transparent extruded plastics material such as PVC so that it does not obscure the view through the windscreen.

As illustrated in 2, 2A and 2B, a series of carriages 24 having a T-shaped profile are arranged to slide up and down along the track 16, with the arms of the "T" terminating in re-entrant flanges 26 which hold the carriages in position. The spars or ribs 14 are clipped into U-shaped slots 28 formed in the leg portions 30 of each T-shaped carriage 24. A drive cable 33 has first and second legs 34 and 36. A pulley housing 40 is mounted to an interior surface of the windscreen or alternatively to the rear interior roof edge of the vehicle just above the windscreen 22, and the second leg of the cable 36 passes around a pulley 42 which is mounted rotatably within the pulley housing 40, and is attached at one end 36A to the uppermost carriage 24A. The first leg of the cable 34 is attached at its uppermost end 34A to the same carriage 24. Both the first and second legs 34 and 36 of the cable pass through gaps 43 defined between the rail 16 and successive carriages 24 below the uppermost carriage 24A. The other ends of the cable legs 34 and 36 are attached to a double reel 44 which is fitted to a drive shaft extending from an electric motor 46. The electric motor 46 is mounted horizontally out-of-sight against a rearmost lower surface of the rear dash 47 of the vehicle.

Figure 2B:
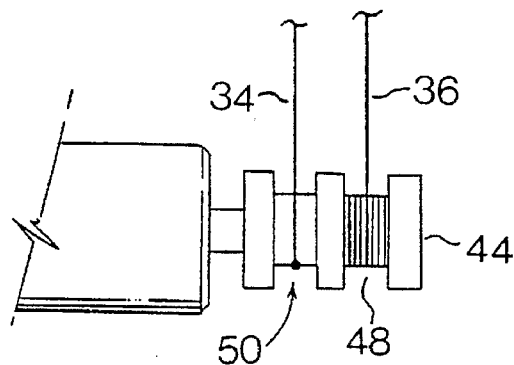

As is clear from the detail in FIG. 2B, the first fixed leg 34 of the cable is connected so that the leg 34 winds and unwinds within a first spool portion 48 in the reel and the second leg 36 of the cable is connected at a location within a second spool portion 50 and is oppositely wound to the windings of the first leg 34. As a result, rotation of the reel 44 in one direction will cause the second leg 36 to be wound up and the first leg 34 to be unwound from the reel, and vice versa. During unwinding of the first leg of the cable, this leg will travel upwards in the direction of arrow 52 and the second leg of the cable 36 will travel downwards in the direction of arrow 54. The various carriages 24 and the spars 14 through which the first and second legs 34 and 36 of the cable pass will be therefore pulled upwards to the deployed position illustrated in FIG. 1. In the deployed position, it can clearly be seen that the Tyvel® material 12 is still partly folded. Both legs 34 and 36 of the cable pass over a double pulley 55 which is mounted adjacent the base of the interior surface of the windscreen 22 so as to ensure that the portion of the cable 33 supporting the blind is held substantially parallel to the windscreen.

When the direction of rotation of the double reel is reversed, the entire blind will be lowered to a stowed folded position in which the carriages move downwardly to a position in which they will stack one on top of the other at the base of the rail 16.

The motor 46 is controlled by a switch 56 which is mounted in an appropriate accessible position near the driver's seat of the vehicle. On disembarking from the vehicle, the driver closes the switch 56, which causes the blind 10 to be raised in the manner previously described. On entering the vehicle, the driver depresses the switch once more, which causes the motor 46 to reverse, thereby lowering the blind in the manner described previously. The switch 56 may be incorporated in the same circuitry as a central locking or disarming system of the vehicle, with the result that the blind is raised automatically every time the vehicle is locked by means of a remote locking or immobilising button.

Figure 4:
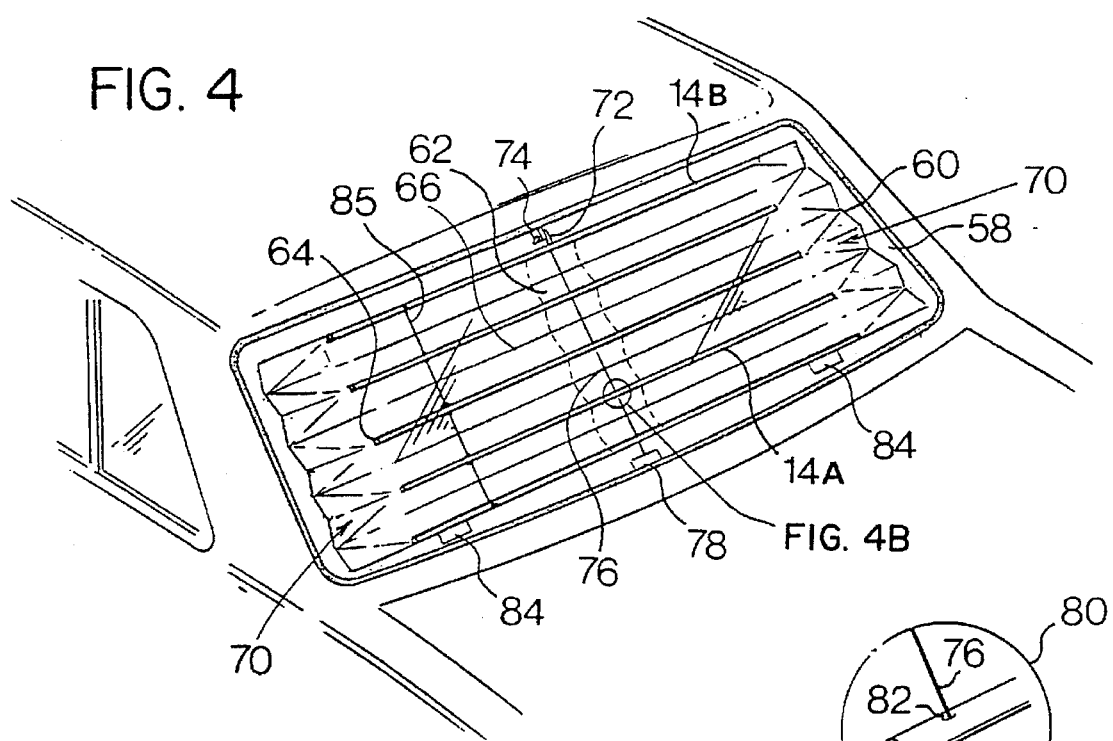
FIG. 4 shows an alternative embodiment of a supplementary sunshield of the invention deployed on the front windscreen of a vehicle.
Figure 4B:
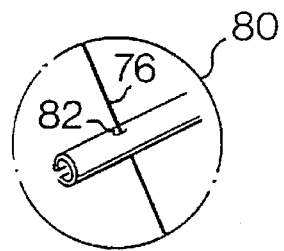
FIG. 4B shows an enlarged view of a component illustrated in FIG. 4.
Figure 4A:
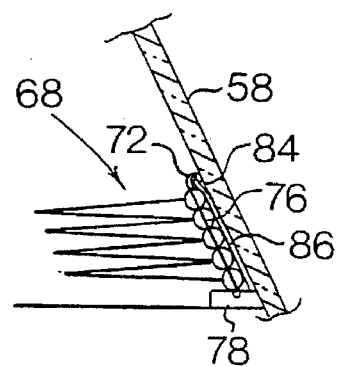
FIG. 4A shows a cross-sectional detail of the sunshield of FIG. 4 in the folded or stowed position.

Turning now to FIGS. 4, 4A and 4B, a front windscreen 58 of the vehicle is shown fitted with a sunshield 60. The sunshield 60 has a structure which is similar to the sunshield 10, with a similar parallel array of spars 14A. The spars extend through a central reinforced patch of fabric 62, and are mounted to alternate convex parallel folds 64 formed in the blind 12 in the manner illustrated in the detail 15 in FIG. 2. The convex parallel folds 64 alternate with concave folds 66 formed in the blind so as to enable the blind to concertina into a collapsed position 68 indicated in FIG. 4A. Triangular reverse folded portions 70 are formed in the side edges of the blind, and will be described in further detail further on in the specification.

Mounted to the middle of the uppermost spar 14B is a hook 72 which is arranged to hook into a complementary eye 74 which is fixed to an upper interior surface of the vehicle just in front of the rear view mirror, or alternatively to the stem of the mirror. An elastic cord 76 is tied at its lower end to a mounting plate 78 fixed to a front centre portion of the dash of the vehicle. As is shown in detail at 80, the elastic cord 76 passes loosely through apertures 82 formed through the spars 14A, and the upper end of the elastic cord is anchored to the uppermost spar 14B adjacent the hook 72.

The lowermost spar may optionally be fixed to the dash of the vehicle by means of adhesive tags 84 or the like. A non-elastic cord 85 is tied at spaced intervals to adjacent spars 14B so as to prevent overstretching of the blind.

After the vehicle has been entered, the sunshield 60 is unhooked from the eye 74 and is lowered to the folded position indicated at 68 in FIG. 4A. It is clear from FIG. 4A how the natural tension in the elastic cord 76 causes the spars 14A and 14B to be gathered together in a compact arrangement at the base of the windscreen. When in the stowed position, the hook 72 may be hooked over an appropriate tag 84 formed in an upwardly angled portion 86 of the mounting plate 78.

The from blind 60 may also be motorized, though this is not strictly necessary, due to the fact that the blind is easily accessible and can be manipulated directly by the driver, in contrast to the rear blind.

Figure 5:
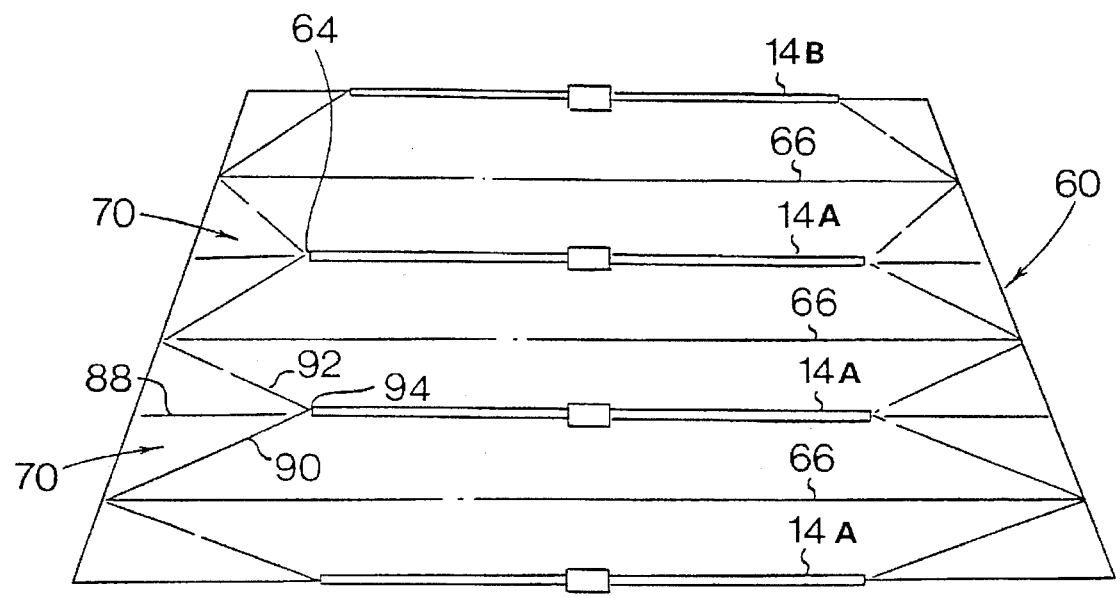
FIG. 5 shows a plan view of a sunblind in the unfolded deployed position.

Referring now to FIG. 5, an unfolded plan view of the sunblind 60 is shown. The series of parallel convex folds 64 which carry the spars 14B and 14A are shown alternating with the parallel concave folds 66. Each reverse folded triangular portion 70 comprises a central concave fold 88 which is co-linear with the convex fold 64. The concave fold 88 and a pair of convex folds 90 and 92 converge at a vertex 94 adjacent one end of the spar 14A.

Figure 6:
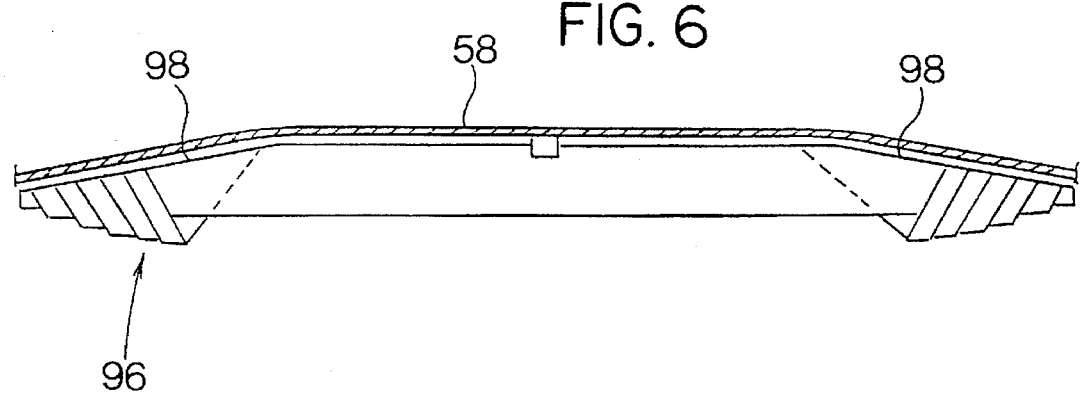
FIG. 6 shows a top view of the sunblind of FIG. 5 in the folded or stowed position.

The reverse folded triangular portion 70 allows the blind to be folded into the configuration illustrated at 96 in FIG. 6, with the convex folded portions 90 and 92 defining rearwardly inclined leading edges 98 at the sides of the folded blind 60. This allows the folded blind to conform with the inwardly curved profile of the windscreen 58. The structure of the front sunshield 60 is substantially identical to the structure of the rear sunshield 10.

One advantage of the sunshield of the invention is that it can easily be retrofitted to most types of passenger vehicles, owing to the fact that it is centrally mounted. As a result, custom fitting required for a blind having rails mounted on either side of the windscreen of a particular vehicle would not be necessary, and one particular blind can be fitted to a large number of different vehicles.

I claim:

1. A vehicle sunshield comprising:
   a blind shaped and sized to substantially cover a curved vehicle windscreen having an inward curvature at each of its opposite sides;
   a plurality of elongated spars extending horizontally in use to support the blind at spaced intervals;
   guide means arranged to act midway along each spar for guiding the blind between a stowed position in which the windscreen is unshaded and a deployed position in which the windscreen is shaded; and
   drive means for driving the guide means between the stowed position and the deployed position;
   said guide means including a substantially rigid and stationary guide track to be mounted in a plane towards the center of the windscreen substantially flush against an inner surface thereof and between upper and lower edges of the windscreen, and a plurality of carriages wherein each spar is supported by one carriage and said carriages are mounted slidably to the guide track;
   said blind being formed from a semi-rigid material which has alternate parallel folds formed therein so as to allow the blind to concertina into the stowed position;
   wherein inwardly folded portions are formed towards opposite side edges of the blind, the inwardly folded portions being arranged to allow the side edges of the blind to fold inwardly in conformity with the inward curvature of the curved sides of the vehicle windscreen.

2. The vehicle sunshield according to claim 1, wherein the drive means includes a reversible motor, a drive cable and at least one pulley around which the drive cable is passed, the drive cable being fixed to at least one of the carriage and spar.

3. The vehicle sunshield according to claim 2, wherein the drive means includes a double reel arranged to be driven rotatably by the motor, the double reel including a first spool to which one end of the cable is affixed and an adjacent second spool to which the other end of the cable is affixed, whereby rotation of the double reel in one direction causes unwinding of the one end of the cable and winding up of the other end of the cable, and rotation of the double reel in the other direction has the opposite effect.

4. The vehicle sunshield according to claim 1, wherein the inwardly folded portions are triangular in form, with a central concave fold which is co-linear with each convex parallel fold and a pair of convex folds extending from a vertex on the concave fold towards points on the side edge of the blind where the adjacent parallel concave folds are located.

5. A vehicle sunshield comprising:

a blind shaped and sized to substantially cover a curved vehicle windscreen having an inward curvature at each of its opposite sides;

a plurality of elongated spars extending horizontally in use to support the blind at spaced intervals;

guide means arranged to act midway along each spar for guiding the blind between a stowed position in which the windscreen is unshaded and a deployed position in which the windscreen is shaded;

connector means for allowing the blind to be detachably mounted to an upper central fixture within the vehicle;

a substantially rigid and stationary guide track arranged to be mounted in a plane towards the center of the windscreen substantially flush against an inner surface thereof and between upper and lower edges of the windscreen;

a plurality of carriages wherein each spar is supported by one carriage and said carriages are mounted slidably to the guide track;

said blind being formed from a semi-rigid material which has alternate parallel folds formed therein so as to allow the blind to concertina into the stowed position, wherein inwardly folded portions are formed towards opposite side edges of the blind, the inwardly folded portions being arranged to allow the side edges of the blind to fold inwardly in conformity with the inward curvature of the curved sides of the vehicle windscreen.

6. The vehicle sunshield according to claim 5, wherein an elasticated cord extends between a central lower mounting point towards the base of the windscreen and an upper mounting point located towards a midpoint of the spar adjacent the connector means.

* * * * *